United States Patent [19]

Takayama

[11] Patent Number: 4,838,330

[45] Date of Patent: Jun. 13, 1989

[54] PNEUMATIC TIRE

[75] Inventor: Masahiro Takayama, Nishitama, Japan

[73] Assignee: Bridgestone Corporation, Tokyo, Japan

[21] Appl. No.: 136,999

[22] Filed: Dec. 23, 1987

[30] Foreign Application Priority Data

Mar. 23, 1987 [JP] Japan .................................. 62-68372

[51] Int. Cl.[4] ............................................. B60C 11/24
[52] U.S. Cl. ................... 152/537; 152/209 R
[58] Field of Search .................... 152/209 R, 537, 454, 152/538

[56] References Cited

U.S. PATENT DOCUMENTS

| 3,814,160 | 6/1974 | Creasey | 152/209 R X |
| 3,916,968 | 11/1975 | Masson | 152/537 X |
| 4,349,061 | 9/1982 | Hirakawa et al. | 152/209 R |
| 4,739,811 | 4/1988 | Rampl | 152/209 R |

FOREIGN PATENT DOCUMENTS

| 49-80703 | 8/1974 | Japan . | |
| 60-15203 | 1/1985 | Japan | 152/209 R |

Primary Examiner—Michael W. Ball
Assistant Examiner—Ramon R. Hoch
Attorney, Agent, or Firm—Cushman, Darby & Cushman

[57] ABSTRACT

A pneumatic tire comprising a tread having an outer tread portion arranged at a radially outer side of the tire and composed of one kind of rubber, and an inner tread portion arranged radially inward of an outer surface of a tread wear indicator and composed of several kinds of rubbers, and a pair of sidewalls each arranged between the tread and a bead, the inner tread portion being axially divided into at least three regions and having a central region extending across an equatorial line of the tire and side end regions arranged in opposite sides of the central region, hardnesses of the rubbers of the inner tread portion being gradually increased axially from the central region to the side end region, and hardness of the rubber of an axially outermost side end region being smaller than that of the rubber of the outer tread portion.

6 Claims, 11 Drawing Sheets

PNEUMATIC TIRE

FIELD OF THE INVENTION

This invention relates in general to a pneumatic tire, and in particular to an improvement in the tread portion of pneumatic tires for vehicles adapted to be operated on smooth surface roadways at high speed.

The invention especially relates to a pneumatic tire which improved the comfortable riding performance without degrading the handling performance, wear resisting performance and uneven wear resisting performance.

DESCRIPTION OF THE PRIOR ART

Conventionally, it has been proposed to decrease the hardness of tread rubber to improve the comfortable riding performance of the pneumatic tire. There is, however, the drawback that, since the rigidity in the lateral direction of the tire is reduced concurrently and the movement of the tread is increased, the handling performance, wear resisting performance and uneven wear resisting performance are considerably reduced. Also, in order to improve the comfortable riding performance of a pneumatic tire, the tread has been axially divided into a central portion and side end portions, and different kinds of rubbers used in these portions. However, since the tread surface that is brought into contact with the road is composed of different kinds of rubbers, variation in wear occurs betweenthe rubbers of different kinds, so that the wear on a part of the tread is increased and causes the vibration of the tire.

Accordingly, it is an object of the present invention to provide an improved pneumatic tire wherein the comfortable riding performance is greatly improved without degrading the handling performance, wear resisting performance and uneven wear resisting performance.

The inventor has made various investigations and experiments with respect to the vibration of a tire, the noise of the inside of a vehicle, the input distribution from the road to the tire and the arrangement of the tread rubbers which are causative of these vibration and noise, and the hardnesses of these rubbers, which are relative to various performances during the running of a tire on road, particularly to the comfortable riding performance.

First, the investigation was made with respect to the vibration fo acceleration of a spring which occurs when the vehicle rides across bumps of the road and is less than 100 Hz. As shown in FIG. 15, the vibration of up-and-down direction (indicated by the solid line) peaks around 10 Hz to 20 Hz and round 70 Hz to 90 Hz, and the vibration of fore-and-aft a direction peaks around 30 Hz to 40 Hz and around 70 Hz to 90 Hz. Corresponding to the peaks of these vibrations, the noise of the inside of a vehicle, as shown in FIG. 16, peaks around 30 Hz to 40 Hz and 70 Hz to 90 Hz. It has been found that the peaks of these vibrations are causative of a so-called harshness that poses problems when a vehicle rides across bumps.

Also, among the peaks of these vibrations, particularly the vibrations of 30 Hz to 40 Hz in the fore-and-aft direction are largely invovled in the coupled vibration that occurs on tires and suspension systems therefor. It was, therefore, found that it is necessary to reduce particularly the input of fore-and-aft direction which is applied to the tire when the vehicle rides across bumps, in order to reduce these vibrations and noises and improve the comfortable riding performance.

Hence, the inputs of the up-and-down direction and fore-and-aft direction when the vehicle rides across bumps, were analyzed. These inputs are distributed as shown in FIG. 17, and it has been found that the input of the fore-and-aft direction is large particularly in the central portion of the tread of the tire. From this fact, it was expected that the shearing rigidity of the fore-and-aft direction of the central portion of the tire is concerned with the input of the fore-and-aft direction and that by decreasing the shearing rigidity of the tread rubber of the central region of the tread, that is, by decreasing the hardness of the read rubber of the central region of the tread, the input of the fore-and-aft direction is reduced. As a result, it was found that, by differentiating the hardness of the tread rubber of the central portion from those of the tread rubber of the side end portions, that is, be greatly reducing the hardness of the tread rubber of the central portion as compared with those of the tread rubber of the side end portions, the variation in the axial force of the fore-and-aft direction was greatly reduced. However, it was found that the handling performance and wear resisting performance was inferior and that the tread wore unevenly or spottily because of the difference of hardnesses between the central and side end portions, thereby resulting in degradation of vibration level.

In order to eliminate these drawbacks, further investigations were made. As a result, the tread was constructed so as to comprise two layers of a radially outer tread portion and a radially inner tread portion, and the inner tread portion was arranged radially inward of a tread wear indicator so that, in use, it does not appear on the tread surface, and the inner tread portion was composed of rubber layers of two or more layers and divided into at least three regions. Furthermore, by investigating the relationship between the hardnesses of the inner tread rubber and the outer tread rubber, it has been found that the comfortable riding performance can be improved without degrading the handling performance, wear resisting performance and uneven wear resisting performance. And, the inventor has made further investigations and reached the present invention.

SUMMARY OF THE INVENTION

The foregoing object is accomplished in accordance with the present invention by providing a pneumatic tire comprising a tread having an outer tread portion arranged at a radially outer side of the tire and composed of one kind of rubber, and an inner tread portion arranged radially inward of an outer surface of a tread wear indicator and composed of several kinds of rubbers, and a pair of sidewalls each arranged between the tread and a bead, the inner tread portion being axially divided into at least three regions and having a central region extending across an equatorial line of the tire and side end regions arranged in opposite sides of the central region, hardnesses of the rubbers of the inner tread portion being gradually increased axially from the central region to the side end region, and hardness of the rubber of an axially outermost side end region being smaller than that of the rubber of the outer tread portion. The hardness of the rubber of the central region of the inner tread portion may be smaller than that of rubber of the sidewall and that of the rubber of the outer tread portion. The tread may be formed with main grooves each extending circumferentially around the tire, and the main groove may be formed in such a manner that the location thereof is within 20% to 32% of a tread width of the tread from the tire equatorial line, and divisional position between the central and side end regions of the inner tread portion may be within 25% of a groove width of the main groove from a groove center of the main groove.

Because the tread according to the present invention has the outer tread portion arranged at the radially outer side of the tire and composed of one kind of rubber, and has the inner tread portion arranged radially inward of the outer surface of the tread wear indicator and composed of several kinds of rubbers, the tread rubber of the inner tread portion by no means appears on the tread outer surface until the last stage of wear like. For this reason, the tread rubbers of different kinds do not appear on the tread outer surface during wear, so that uneven wear, which causes the vibration of a vehicle, does not occur, and in addition, the wear resisting performance can also be maintained by using a normal tread rubber to the outer tread portion. Because the hardness of the rubber of the central region of the inner tread portion is smaller than those of rubbers of the side end portions and the outer tread portion, the input in the fore-and-aft direction when the tire rides across bumps of the road, becomes small in the central region of the tread. For this reason, the axial force in the fore-and-aft direction of an axis for rotation of the tire becomes small, so that the level of noise is greatly reduced. Because the hardnesses of the rubbers of the inner tread portion is gradually increased axially from the central region toward the side end portion, and because the hardness of the rubber of the axially outermost side end region is smaller than that of the rubber of the outer tread portion, the lateral force by the outer tread portion when the tire corners is sufficiently large and the cornering power is sufficiently large, so that the handling performance can be sufficiently maintained.

BREIF DESCRIPTION OF THE DRAWINGS

The features and advantages of a pneumatic tire according to the present invention will be more clearly understood from a consideration of the following detailed description in conjunction with the accompanying drawings in which.

DETAILED DESCRIPTION OF THE PREFERRED EMBODIMENTS

Figure 1:
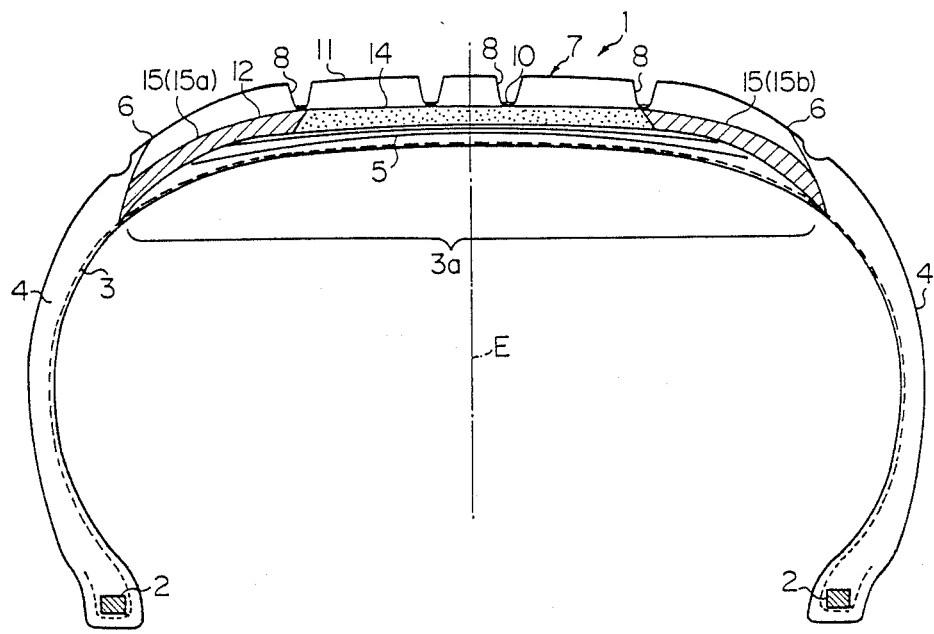
FIG. 1 is a cross sectional view showing a first embodiment of a pneumatic tire constructed in accordance with the present invention.
Figure 2:
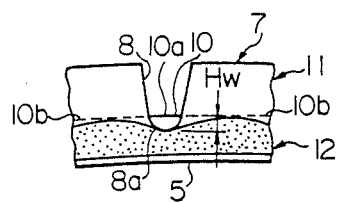
FIG. 2 is an enlarged part-sectional view showing that the inner tread portion of the tread shown in FIG. 1 is arranged radially inward of a tread wear indicator.

Referring first to FIGS. 1 and 2, there is shown a first embodiment of a pneumatic tire constructed in accordance with the present invention. The pneumatic tire (a tire size, 175/70R13) of this embodiment is generally designated by reference numeral 1, and comprises a carcass 3 extending between opposite beads 2 and 2, a belt 5 made up of layers and arranged radially outward of a crown portion 3a of the carcass 3, a tread 7 arranged radially outward of the belt 5 and extending axially between opposite shoulders 6 and 6 and circumferentially around the tire 1, and a pair of sidewalls 4 and 4 each arranged between the tread 7 and the bead 2. The portions other than the tread 7 are substantially identical in construction and operation to those of pneumatic radial tires for standard passenger cars. The tread 7 is formed with a plurality of circumferential main grooves 8 each extending circumferentially of the tire. As shown in FIG. 2, the groove bottom portion 8a of each ciicumferential main groove 8 is provided at the several positions around the circumference of the tire with a plurality of tread wear indicators 10 each projecting outward from the groove bottom portion 8a by a predetermined height Hw.

The tread 7 has an outer tread portion 11 arranged at the radially outer side of the tire and an inner tread portion 12 arranged directly under the outer tread portion 11. The outer tread portion 11 comprises one kind of compound G1 (Hardness 62°) which is mainly composed of natural rubber or synthetic rubber. The inner tread portion 12 comprises two kinds of compounds G2 (Hardness 48°) and G3 (Hardness 57°) each of which is mainly composed of natural rubber or synthetic rubber, and as clearly shown in FIG. 2, is provided radially inward of the outer surface portion 10a (the extension line of the outer surface portion 10a is indicated by the borken line 10b) of the tread wear indicator 10 provided in the groove bottom portion 8a of the circumferntial main groove 8.

The inner tread portion 12 of the tread 7 is axially divided into three regions consisting of a central region 14 extending across a tire equatorial line E (or a tread center line) and composed of the aforesaid compound G2 (Hardness 48°) and a pair of side end regions 15a and 15b each extending from the central region 14 and terminating in the shoulder 6 and each composed of the aforesaid compound G3 (hardness 57°).

The hardness (48°) of the compound G2 of the central region 14 of the inner tread portion 12 is smaller than the hardnesses (57°) of the compounds G3 and G3 of the side end regions 15a and 15b of the inner tread portion 15, the hardness (62°) of the compound G1 of the outer tread portion 11 and the hardness of the rubber of the sidewall 4. The hardness of the compound of an axially outermost region of the inner tread portion 12 is smaller than that of the compound of the outer tread portion 11. In this embodiment, the hardnesses (57°, 57°) of the compounds G3 and G3 of the side end regions 15a and 15b of the inner tread portion 12 are smaller than the hardness (62°) of the compound G1 of the outer tread portion 11. Thus, the hardness of the inner tread portion 12 is larger at the side end portions thereof than at the central portion thereof, and the hardness of the axially outermost region of the inner tread portion 12 is smaller than that of the outer tread portion 11.

Three kinds of test tires A, B and C were prepared and tested to confirm the effect of the present invention. These test tires were built, shaped and curved in a conventional tire mold.

The test tire A (according to the present invention) is substantially identical to the tire 1 shown in FIGS. 1 and 2. The test tire B (comparative example 1) is substantially identical to the test tire A, except that the whole tread is composed of the compound G1 (Hardness 62°) which was used in the outer tread portion 11 of the tread 7 of the tire 1 shown in FIGS. 1 and 2. The test tire C (comparative example 2) is substantially identical to the test tire A, except that the whole tread is composed of the compound G2 (Hardness 48°) which was used in the central region 14 of the inner tread portion 12 of the tread 7 of the tire 1 shown in FIGS. 1 and 2. With these test tires, the axial force in the fore-and-aft direction of the tire when the tire rides across a bump, was tested as vibration and noise performance, the cornering power was tested as handling performance, and the work done by wear was tested as wear resisting performance.

The test of the axial force in the fore-and-aft direction when the tire rides across a bump, was made by a drum test machine of the standard indoor type wherein a bump of a trapezoidal cross section (having a height of 10 mm and an upper side of 20 mm) is mounted, throughout the full width of the tread that comes into with road, on the drum surface. The test tires properly inflated with air under a tire normal pressure were pressed against the drum surface under a tire normal load, and driven at a predetermined speed. With these conditions, the axial forces in the fore-and-aft direction of an axis of rotation of the tire were measured, and the values between the peaks of the axial forces (P-P value) were compared.

The cornering power test was made by a handling performance testing machine of the standard indoor type. By changing the slip angle of the tire driven under load, the relationships between the cornering power and the load were measured and compared.

In the test of the work done by wear, the test tires inflated with air under a pressure of 2.0 kgf/cm$^2$ were pressed against a horizontal flat plate with a slip angle of 1.5 deg. ànd a load of 300 kgf. The amount of movement D of the outer surface rubber of the tread, and the horizontal force F (friction force) applied ot the outer surface rubber were measured from the inside of the cornering of the surface in contact with the horizontal flat plate to the outside, and the work done by wear W of the tread surface rubber when tire is driven under load, was calculated by the following equation:

Work done by wear $W = \int_L F \times D \, ds$.

wherein the F indicates a horizontal force applied to the outer surface rubber of the tread the D indicates the amount of movement of the outer surface rubber, the ds indicates a unit area in the tire section direction, and the L indicates the circumference of the tire.

Figure 3:
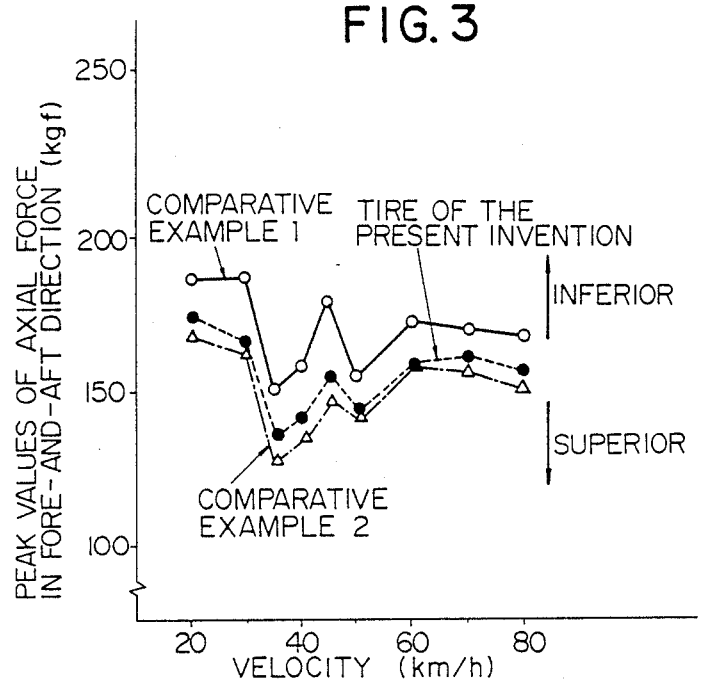
FIG. 3 is a view showing the test results for vibration and noise performance of three kinds of test tires, with the axial force in the fore-and aft direction in kgf taken on the ordinate and with the velocity in km/h taken on the abscissa.
Figure 4:
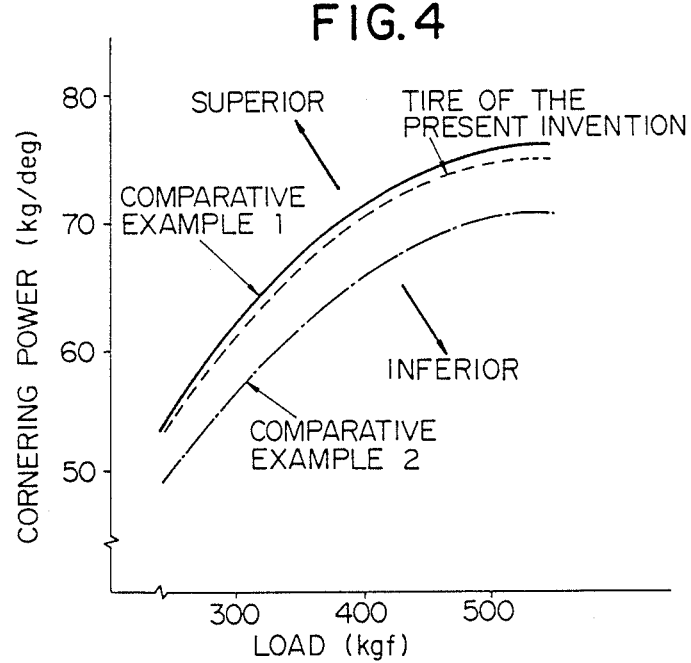
FIG. 4 is a view showing the test results for handling performance of three kinds of test tires, with the cornering power in kg/deg. taken on the ordinate and with the load in kgf taken on the abscissa.
Figure 5:
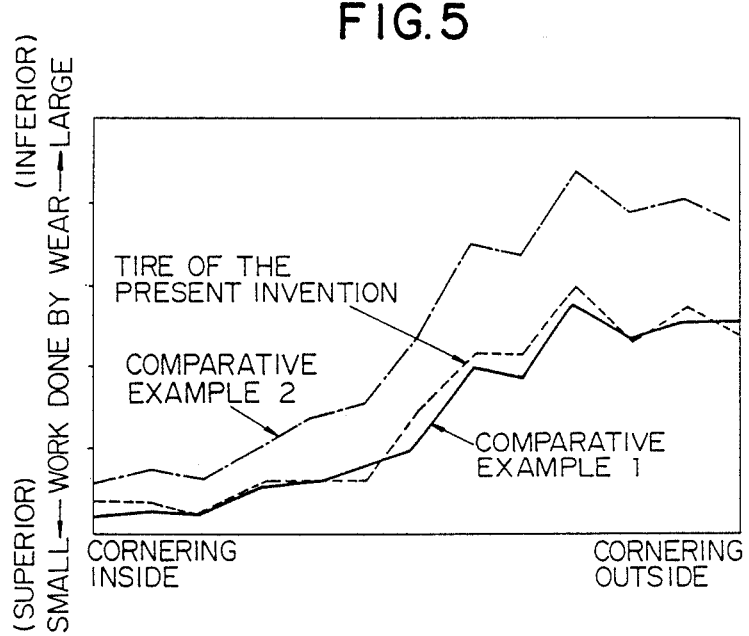
FIG. 5 is a view showing the test results for wear resisting performance of three kinds of test tires, with the work done by wear taken on the ordinate.

The test results for the aforementioned three kinds of test tires are shown in FIGS. 3, 4 and 5. In FIGS. 3, 4 and 5, the tire according to the present invention, comparative example 1 and comparative example 2 are indicated by the broken line, solid line and chain line, respectively.

As shown in these test results, the comparative example 2, wherein the soft compound Gs (Hardness 48°) was used in the entire tread rubber, is small and superior in the vibration and noise performance (the axial force in the fore-and-aft direction) but inferior in the handling performance (the cornering power) and wear resisting performance (the work done by wear) in comparison with the tire according to the present invention and comparative example 1, and thus is not suitable for practical use. The tire according to the present invention is by no means inferior in the handling performance and wear resisting performance to the comparative example 1 wherein the compound G1 (Hardness 62°) was used in the entire tread rubber, and also superior in the vibration and noise performance to the comparative example 1. In addition, since the outer tread portion 11 of the tread comprises a unitary tread rubber and the inner tread portion 12 is arranged radially inward of the surface portion 10a of the tread wear indicator 10, uneven wear does not occur until the last stage of wear, and the wear resisting performance is also superior. Thus, according to the present invention, the handling performance, wear resisting performance, and vibration and noise performance are all improved at the same time.

Figure 6:
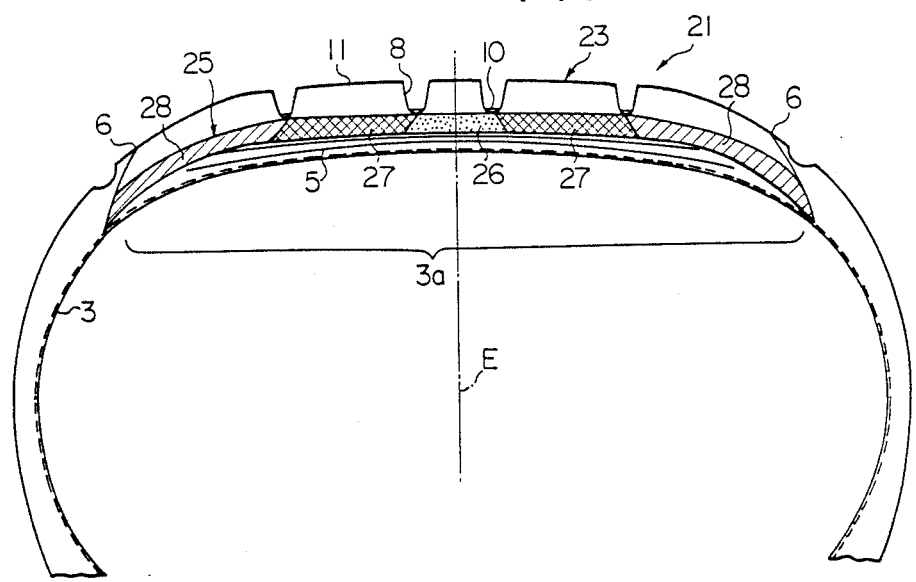
FIG. 6 is a cross sectional view showing a second embodiment of a pneumatic tire constructed in accordance with the present invention.

FIG. 6 shows a second embodiment of a pneumatic tire constructed in accordance with the present invention. The pneumatic tire of this embodiment is generally designated by rrference numeral 21, and the portions substantially identical to those of the first embodiment shown in FIG. 1 are designated by like reference numerals for avoiding the detail descriptions therefor. The second embodiment is characterized in that an inner tread portion 25 of a tread 23 is axially divided into five regions. The inner tread portion 25 consists of a central region 26 arranged across a tire equatorial line E, intermediate regions 27 and 27 arranged in opposite sides of the central region 26, and side end regions 28 and 28 each extending from the intermediate region 26 and terminating in a shoulder 6. The central region 26 of the inner tread portion 25 comprises a compound (Hardness 46°) which is mainly composed of natural rubber or synthetic rubber. Each intermediate region 27 of the inner tread portion 25 comprises a compound (Hardness 52°) which is mainly composed of natural rubber or synthetic rubber. Each side end region 28 comprises a compound (Hardness 57°) which is mainly composed of natural rubber or synthetic rubber. Thus, the hardness (46°) of the tread rubber of the central region 26 is smaller than that 62°) of the tread rubber of an outer read portion 11, and the hardnesses (46°, 52°, 57°) of the inner tread portion 12 are gradually increased from the central region thereof toward the side end portion thereof.

Figure 7:
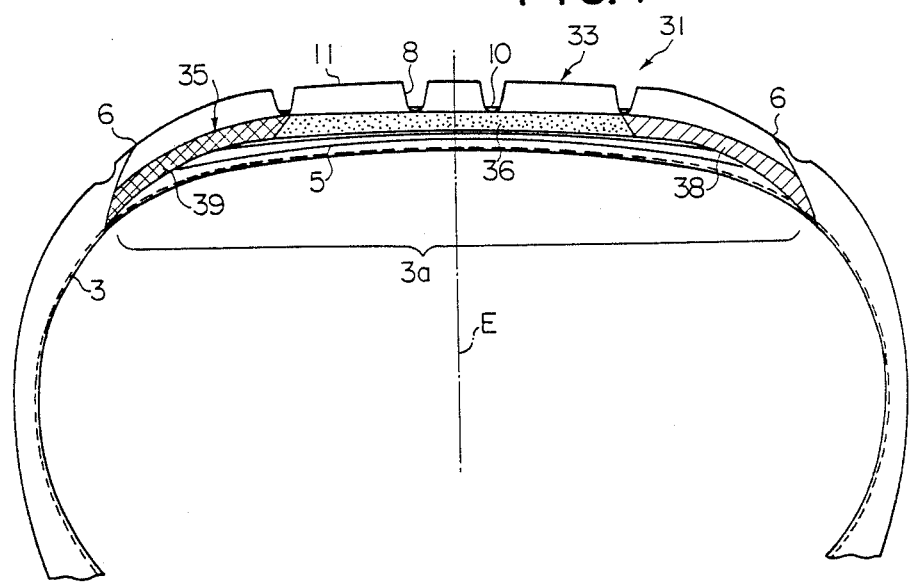
FIG. 7 is a cross sectional view showing a third embodiment of a pneumatic tire constructed in accordance with the present invention.

FIG. 7 shows a third embodiment of a pneumatic tire constructed in accordance with the present invention. The pneumatic tire of this embodiment is generally denoted by reference numeral 31, and the portions substantially identical to those of the first embodiment shown in FIG. 1 are designated by like reference numerals for avoiding the detail descriptions therefor. The third embodiment is characterized in that an inner tread portion 35 of a tread 33 is axially divided into three regions and the hardnesses of the side end portions thereof are different from each other. The hardness (46°) of the tread rubber of a central region 36 of the inner tread portion 35 is smaller than those of the tread rubbers of side end regions 38 and 39, and the hardness (57°) of the tread rubber of the side end region 39 is larger than that (52°) of the tread rubber of the side end region 38. Also, the hardness (57°) of the tread rubber of the side end region 39 is smaller than that (62°) of the tread rubber of an outer tread rubber portion 11 of the tread 33. By arranging the side end region 39 on the outside of the vehicle, the handling performance can be greatly enhanced without degrading the wear resisting performance and the comfortable riding performance.

Figure 8:
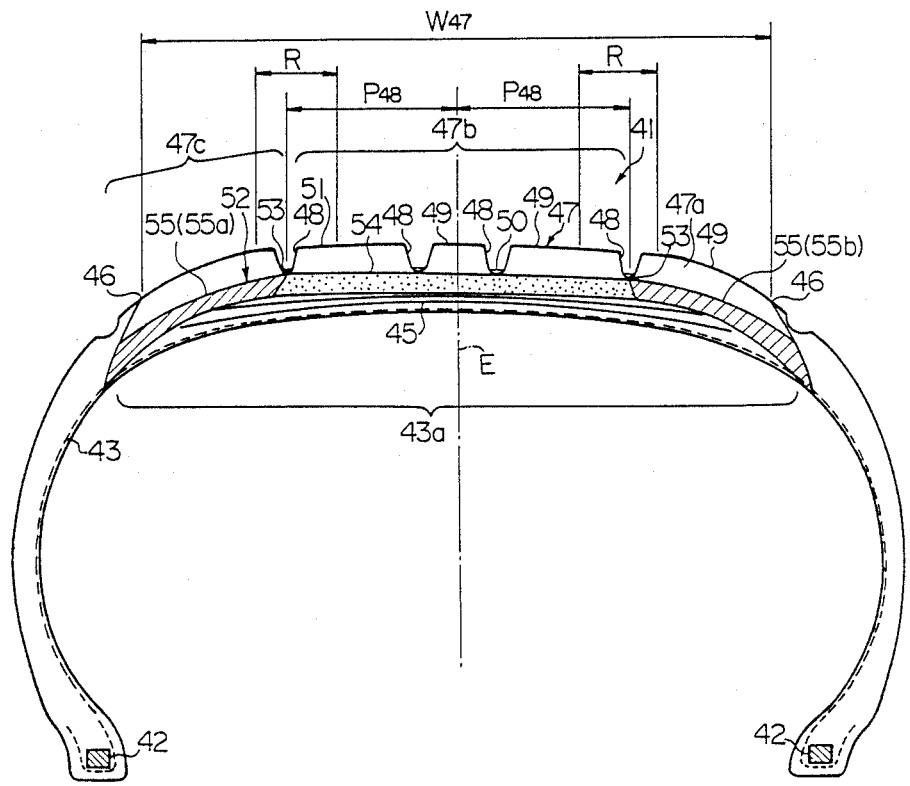
FIG. 8 is a cross sectional view showing a fourth embodiment of a pneumatic tire constructed in accordance with the present invention.
Figure 9:
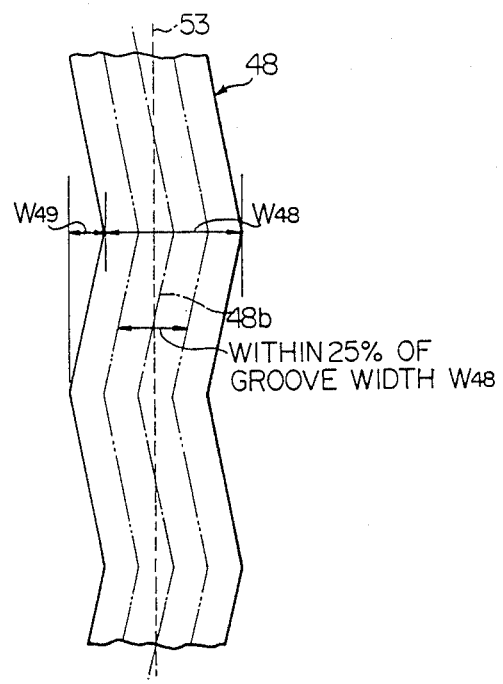
FIG. 9 is a top plan view, partly broken away and on an enlarged scale, of the groove width of the main groove shown in FIG. 8.

Referring to FIG. 8, there is shown a fourth embodiment of a pneumatic tire constructed in accordance with the present invention. The pneumatic tire (a tire size, 175/70R13) of this embodiment is generally designated by reference numeral 41, and comprises a carcass 43 extending between opposite beads 42 and 42, a belt 45 made up of layers and arranged radially outward of a crown portion 43a of the carcass 43, and a tread 47 arranged radially outward of the belt 45 and extending axially between opposite shoulders 46 and 46 and circumferentially around the tire 41. The portions other than the tread 47 are substantially identical in construction and operation to those of pneumatic radial tires for standard passenger cars. The tread 47 is formed at the outer surface portion 47a thereof with four circumferential main grooves 48 each extending zigzag cirumferentially of the tire to form circumferential land portions 49 therebetween. A pair of the outer main grooves 48 and 48 is located in such a manner that the location $P_{48}$ of each groove 48 is within a range R of 20% to 32% of the tread width $W_{47}$ of the tread 47 from a tire equatorial line or tread center line E. A reason for this is that, in the case of less than 20%, the effect of the present invention cannot be obtained satisfatorily. The deflection width $W_{49}$ of the main groove 48, as shown in FIG. 9, is 25% of the groove width $W_{48}$ of the main groove 48, preferably not more than 50%. As clearly shown in FIG. 10, the groove bottom portion 48a of each circumferential main groove 48 is provided the several positions around the circumference of the tire with a plurality of tread wear indicators 50 each projecting outward from the groove bottom portion 48a by a predetermined height $H_{50}$.

The tread 47 has an outer tread portion 51 arranged at the radially outer side of the tire and an inner tread portion 52 arranged directly under the outer tread portion 51. The outer tread portion 51 comprises one kine of compound G1 (Hardness 62°) which has wear resisting performance and is mainly composed of natural rubber or synthetic rubber. The inner tread portion 52 comprises two kinds of compounds G2 (Hardness 48°) and G3 (Hardness 57°) each of which is mainly composed of natural rubber or synthetic rubber, and as shown in FIG. 10, is provided radially inward of the outer surface portion 50a (the extension line of the outer surface portion 51a is denoted by the broken line 50b) of the tread wear indicator 50 provided in the groove bottom portion 48a of the circumferential main groove 48.

Figure 10:
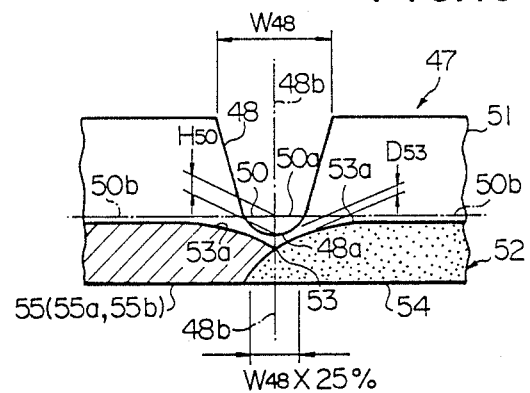
FIG. 10 is a part-sectional view, on an enlarged scale, of the tread portion and main groove shown in FIG. 8.

The inner tread portion 52 of the tread 47 is axially divided, at two divisional positions 53 adjacent the outer main grooves 48, into three regions consisting of a central region 54 extending across the tire equatorial line E and composed of the aforesaid compounds G2 (Hardness 48°) and a pair of side end regions 55a and 55b each extending from the central region 54 and terminating in the shoulder 46 and each composed of the aforesaid compound G3 (Hardness 57°).

the central region 54 and side end region 55a or 55b of the inner tread portion 52, as clearly shown in FIG. 10, have sloped surfaces 53a and 53a, respectively, each extending upward from the divisional position 53 toward the outer read portion 51. The divisional position 53, as shown in FIGS. 9 and 10, is located within 25% of the groove width $W_{48}$ of the main groove 48 from the groove center 48b of the maine groove 48. A reason for this is that, in the case of less than 20%, the effect of the present invention cannot be obtained satisfactorily. Between the divisional position 53 and the groove bottom portion 48a, there is provided the compound G1 of the outer tread portion 51. The thickness $D_{53}$ between the divisional position 53 and the groove bottom portion 48a is not less than 1 mm. A reason for this is that the thickness $D_{53}$ of not less than 1 mm is necessary to prevent groove cracks and the like. The hardness (48°) of the compound G2 of the central region 54 of the inner tread portion 52 is smaller than that (57°) of the compounds G3 and G3 of the side end regions 55a and 55b of the inner tread portion 52 and that (62°) of the compound G1 of the outer tread portion 51. Thus, the hardness of the tread rubber of the inner tread portion 52 is smaller at the central portion thereof than at the side end portion thereof.

The operation of the pneumatic tire constructed as described above will hereinafter be described.

Because the inner tread portion 52 of the tread 47 according to the present invention has the central region 54 having the divisional position 53 at the groove center 48b of the main groove 48, and because the central region 54 is composed of the compound G2 which is soft in hardness, the central portion 47b (shown in FIG. 8) of the tread 47 between two main grooves 48 and 48 becomes in a so-called floating condition wherein it floats on the soft compound G2 of the central region 54 of the inner tread portion 52. In addition, since the opposite divisional positions 53 of the central region 54 are providied within 25% of the groove width $W_{48}$ of the main groove 48 from the groove center 48b of the main groove 48, the central portion 47b of the tread 47 becomes easily moved in the axial direction and fore-and-aft direction of the tire by the increase and decrease of the groove width $W_{48}$ of the main groove 48, so that the tread rigidity in the fore-and-aft direction is reduced and the resilience is considerably increased. And, the extrnal force applied to the central portion 47b of the tread 47 by bumps of road is largely alleviated. As a result, the vibration and noise resulting from the external force applied to the tread 47 are reduced and the comfortable riding performance of the pneumatic tire according to the present invention is greatly enhanced. In addition, since the outer tread portion 51 of the tread 47 is composed of the compound G1, and also the side end portion 55 of the inner tread portion 52 is composed of the compound G3 that is larger in hardness than the compound G2 of the central region 54 of the inner tread portion 52, the tread rigidity of the side end portion 47c (shown in FIG. 8) of the tread portion 47 is sufficiently maintained, and also the handling performance and wear resisting performance during travelling of a tire are sufficiently maintained. The comfortable riding performance of the tire according to the present invention is greatly enhanced without degrading the handling performance and wear resisting performance.

Three kinds of test tires D, E and F were prepared and tested to confirm the effect of the present invention. These test tires were built, shaped and cured in a conventional tire mold.

Figure 11:
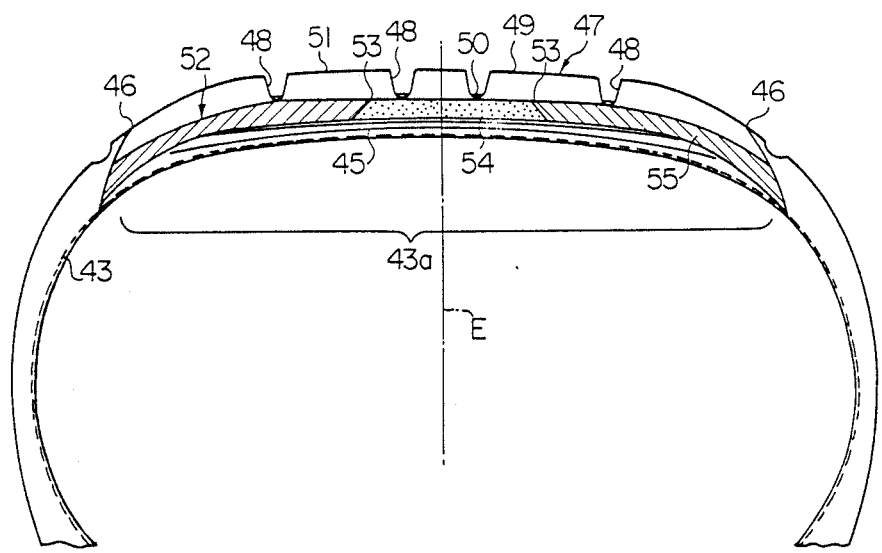
FIG. 11 is a cross sectional view showing one comparative tire which is substantially identical to the tire shown in FIG. 8, except that the divisional position of the inner tread portion of the tread is located axially inward of the outer main groove.
Figure 12:
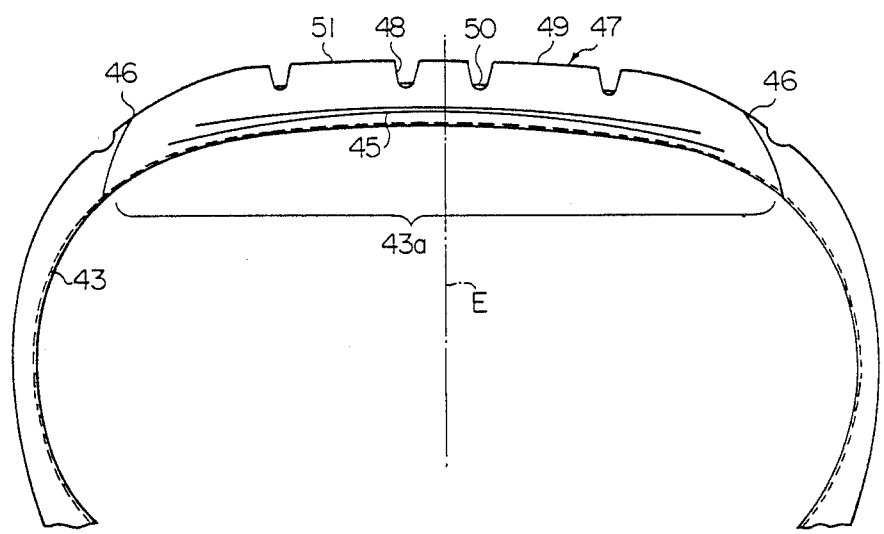
FIG. 12 is a cross sectional view showing another comparative tire which is substantially identical to the tire shown in FIG. 8, except that the whole tread is composed of the compound which is used in the outer tread portion 51 of the tire shown in FIG. 8.

The test tire D (according to the present invention) is substantially identical to the tire shown in FIGS. 8, 9 and 10. The test tire E (comparative example 3), as shown in FIG. 11, is substantially identical to the test tire D according to the present invention, except that the divisional positions 53 and 53 of the inner tread portion 52 of the tread 47 are located axially inward of the outer main grooves 48 and 48. The test tire F (comparative example 4), as shown in FIG. 12, is substantially identical to the test tire D according to the present invention, except that the whole tread rubber is composed of the compound G1 (Hardness 62°) which was used in the outer tread portion 51 of the tire shown in FIG. 8.

With these test tires, the axial force in the fore-and-aft direction of the tire when the tire rides across a bump, was tested as vibration and noise performance, and the cornering power was tested as handling performance.

The test of the axial force in the fore-and-aft direction when the dire rides across a bump, was made by a drum test machine of the standard indoor type wherein a bump of a trapezoidal cross section (having a height of 10 mm and an upper side of 20 mm) is mounted, throughout the full width of the tread that comes into with road, on the drum surface. The test tires properlyin flated with air under a tire normal pressure were pressed against the drum surface under a tire normal load and driven at a predetermined speed. With these conditions, the axial forces in the fore-and-aft direction of and axis of rotation of the tire were measured, and the values between the peaks of the axial forces (P-P value) were compared.

The cornering power test was made by a handling performance testing machine of the standard indoor type. By changing the slip angle of the tire driven under load, the relationships between the cornering power and the load were measured and compared.

Figure 13:
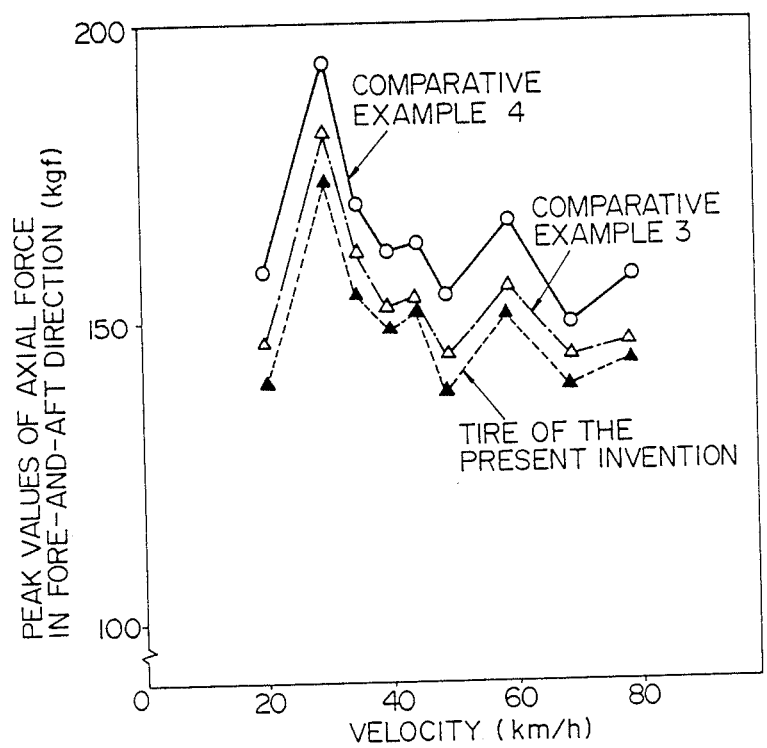
FIG. 13 is a view showing the test results for vibration and noise performance of three kinds of test tires, with the axial force in the fore-and-aft direction in kgf taken on the ordinate and with the velocity in km/h taken on the abscissa.

The test results for the axial force in the fore-and-aft direction of the aforementioned three kinds of test tires and shown in FIG. 13. In FIG. 13, the tire according to the present invention (FIG. 8), comparative example 3 (FIG. 11) and comparative example 4 (FIG. 12) are indicated by the broken line, chain line and solid line, respectively. As shown in these test results, the axial force in the fore-and-aft direction of the tire according to the present invention (FIG. 8) is small at all vehicle speeds as compared with the comparative example 3 (FIG. 11) and comparative example 4 (FIG. 12). As a result, the input in the fore-and-aft direction is greatly reduced and the comfortable riding performance is greatly enhanced.

Next, test tires were made to indicate that the main groove in the outer tread portion of the tread is preferably to be located within a range of 20% to 32% of the tread width from the tread center.

Figure 14:
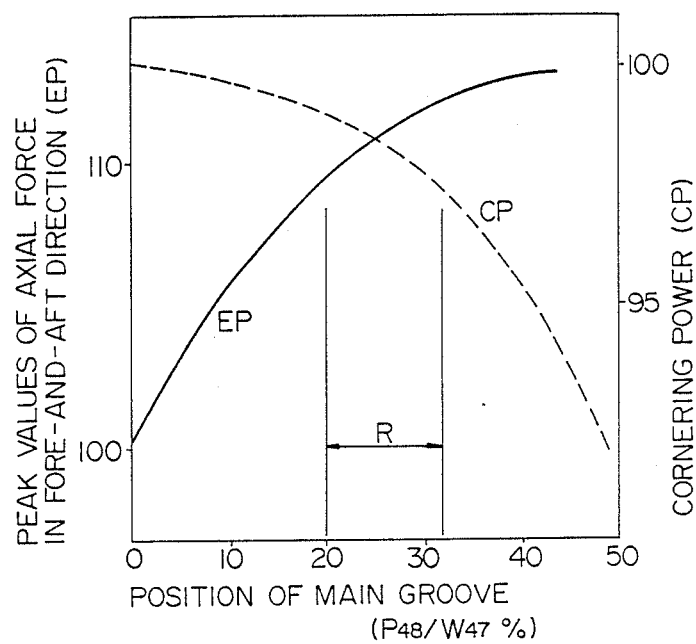
FIG. 14 is a view showing the test results for handling performance of three kinds of test tires, with the cornering power in kg/deg. taken on the ordinate and with the load in khf taken on the abscissa.
Figure 15:
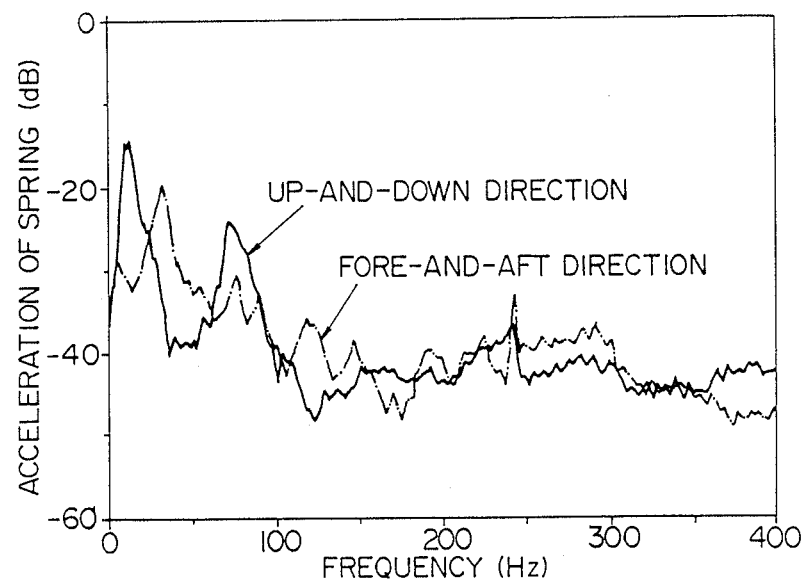
FIG. 15 is a view showing the vibration characteristic of a conventional tire.
Figure 16:
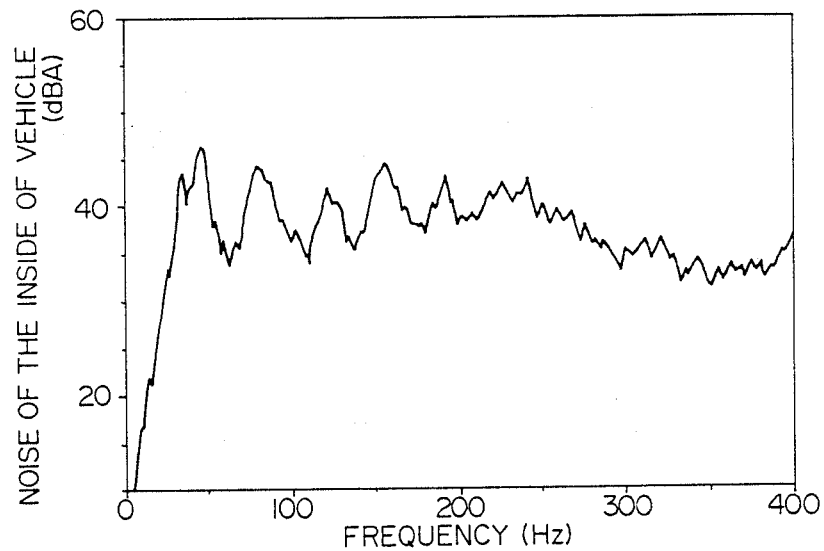
FIG. 16 is a view showing the noise characteristic of the inside of a vehicle using a conventional tire.
Figure 17:
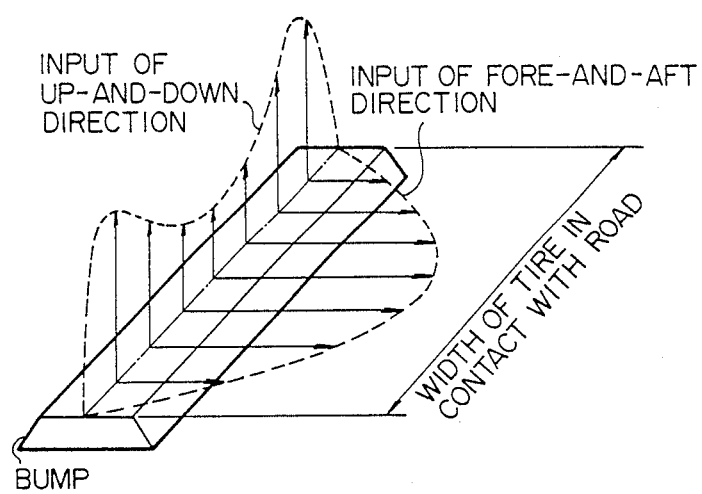
FIG. 17 is a view showing the input distribution of the up-and-down and fore-and-aft directions of a conventional tire when the vehicle rides across a bump of the road.

The test tires were made substantially identically to the pneumatic tire of the embodiment shown in FIG. 8 except the location of main groove, and compared with the aforesaid comparative example 4, which is substantially identical to the pneumatic tire of the embodiment shown in FIG. 8 except that the whole tread rubber is composed of the compound G1 (Hardness 62°) which was used in the outer tread portion 51 of the tire shown in FIG. 8., By using these test tires and comparative example 4, the axial forces in the fore-and-aft direction when the tire rides across a bump, were measured as vibration and noise performance, and the cornering powers were measured as handling performance. The test values for the comparative example 4 were normalized to a value of 100 for comparison purposes. The test values for the test tires were compared to the values of the comparative example 4 and reported to the normalized values of 100 for the comparative example 4. The larger the number, the better the performance. As shown in FIG. 14, the vibration and noise performance and handing performance re extremely superior in the case that the location of the main groove 48 in the tread 47 is within 20% to 32% of the tread width $W_{47}$ from the tread center.

From the foregoing description, it will be seen that an improved pneumatic tire wherein the comfortable riding performance is greatly improved without degrading the handling performance, wear resisting performance and uneven wear resisting performance, is afforded by the present invention.

While certain representative embodiments and details have been shown for the purpose of illustrating the invention, it will be apparent to those skilled in this art that various changes and modifications may be made therein without departing from the spirit or scope of the invention.

What I claim is:
1. A pneumatic tire comprising:
   a carcass having a crown portion, a belt for reinforcing said crown portion, a tread arranged outwardly of said belt and having an outer tread portion arranged at a radially outer side of said tire and composed of one kind of rubber and an inner tread portion arranged radially inward of an outer sur- face of a tread wear indicator and composed of several kinds of rubber, and a pair of sidewalls each arranged between said tread and a bead, said inner tread portion being axially divided into at least three regions and having a central region extending across an equatorial line of said tire and side end regions arranged on oposite sides of said central region, the hardnesses of the rubbers of said inner tread portion being gradually increased axially from said central region to said side end regions, and the hardnesses of the rubber of the axially outermost side end regions being smaller than that of the rubber of said outer tread portion.

2. A pneumatic tire as set forth in claim 1, in which hardness of the rubber of said central region of said inner tread portion is smaller than that of rubber of said sidewall and that of the rubber of said outer tread portion.

3. A pneumatic tire as set forth in claim 1, in which said tread is formed with main grooves each extending circumferentially around said tire, and said main groove is formed in such a manner that the location thereof is within 20% to 32% of a tread width of said tread from said tire equatorial line, and divisional position between said central and side end regions of said inner tread portion is within 25% of a groove width of said main groove from a groove center of said main groove.

4. A pneumatic tire as set forth in claim 3, in which each of said main grooves extends zig zag circumferentially around said tire and has a deflection width which is not less than 50% of said groove width of said main groove.

5. A pneumatic tire as set forth in claim 1, in which said inner tread portion is axially divided into five regions and has a central region arranged across said tire equatorial line, intermediate regions arranged in opposite sides of the central region, and side end regions each extending from the intermediate region and terminating in a shoulder end of the tire.

6. A pneumatic tire as set forth in claim 1, in which said side end regions of said inner tread portion are different in hardness from each other.

* * * * *